United States Patent
Oswal et al.

(10) Patent No.: US 7,616,962 B2
(45) Date of Patent: Nov. 10, 2009

(54) QOS SUPPORT FOR VOIP AND STREAMING SERVICES

(75) Inventors: Anand K. Oswal, Sunnyvale, CA (US); Jayaraman Iyer, Sunnyvale, CA (US); Michael Shannon, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 549 days.

(21) Appl. No.: 11/448,278

(22) Filed: Jun. 7, 2006

(65) Prior Publication Data

US 2007/0287467 A1 Dec. 13, 2007

(51) Int. Cl.
*H04Q 7/20* (2006.01)
(52) U.S. Cl. .................... 455/452.2; 709/249
(58) Field of Classification Search ............... 455/452.2
See application file for complete search history.

(56) References Cited

U.S. PATENT DOCUMENTS

2004/0100903 A1* 5/2004 Han et al. .............. 370/230

OTHER PUBLICATIONS

Shankar et. al., OoS Signaling for Parameterized Traffic in IEEE 802.11e Wireless LANs, Lecture Notes in Comuter Science-Advance Internet Services and Applications Jan. 1, 2002, Springer Berlin/Herdelberg, vol. 2402/2002, pp. 67-83.*

Montes et. al., Deployment of IP Multimedia Streaming Services in Third-Generation Mobile Networks, IEE Wireless Communications, Oct. 2002, vol. 9, Issue 5, p. 84-94.*
Change, Chung-Kuo; "A Mobile-IP Based Mobility System for Wireless Metropolitan Area Networks", School of Informatics, Indiana University Purdue University Indianapolis, Proceedings of the 2005 International Conference on Parallel Processing Workshops, 7 pages.
WiMAX Forum, "Mobile WiMAX—Part I: A Technical Overview and Performance Evaluation"; Feb. 21, 2006, 53 pages.

* cited by examiner

*Primary Examiner*—Lester Kincaid
*Assistant Examiner*—Phuoc Doan
(74) *Attorney, Agent, or Firm*—Brian N. Young; Trellis IP Law Group, PC

(57) ABSTRACT

In one embodiment, techniques provide quality of service (QoS) for services using a gateway. The techniques include receiving one or more control signaling messages from a subscriber station at the gateway. The gateway is in a signaling path for the subscriber station where the subscriber station communicates through a wireless network. The gateway determines a policy to apply for the service based on the one or more control signaling messages. QoS parameters may be determined for the service based on the policy. For example, QoS parameters are determined for a session that is created for a media stream. The media stream may flow from the subscriber station to a base station to the gateway, and vice versa. The gateway may communicate the QoS parameters to the base station to cause the base station to reserve resources in the wireless network. Accordingly, a session for the subscriber station is created and resources are reserved to provide a QoS for a media stream.

21 Claims, 3 Drawing Sheets

QOS SUPPORT FOR VOIP AND STREAMING SERVICES

BACKGROUND OF THE INVENTION

Embodiments of the present invention generally relate to telecommunications and more specifically to techniques for providing quality of-service (QoS) for services using a gateway.

As wireless networks mature, more services are being provided. For example, streaming video and voice-over Internet protocol (VoIP) calls are being supported. These services may use a lot of bandwidth and are being deployed on networks that may not be fully developed to handle the services.

An Internet protocol multi-media system (IMS) may be used to provision QoS for certain services. However, the IMS infrastructure is complicated and very expensive to build. Thus, a complete IMS infrastructure may not be completely built for most networks. Also, for developing nations, the prospect of having an IMS infrastructure in place may be far in the future. Accordingly, for networks that do not have the IMS infrastructure in place, providing QoS for the above services may not be possible.

DETAILED DESCRIPTION OF EMBODIMENTS OF THE INVENTION

In one embodiment, techniques provide quality of service (QoS) for services using a gateway. The techniques include receiving one or more control signaling messages from a subscriber station at the gateway. The gateway is in a signaling path for the subscriber station where the subscriber station communicates through a wireless network. The gateway determines a policy to apply for the service based on the one or more control signaling messages. QoS parameters may be determined for the service based on the policy. For example, QoS parameters are determined for a session that is created for a media stream. The media stream may flow from the subscriber station to a base station to the gateway, and vice versa. The gateway may communicate the QoS parameters to the base station to cause the base station to reserve resources in the wireless network. Accordingly, a session for the subscriber station is created and resources are reserved to provide a QoS for a media stream.

Accordingly, the gateway injects QoS enforcement for a media stream associated with the subscriber station. The gateway can intercept control signaling messages because it is in the call signaling path for the subscriber station. Thus, a new session can be dynamically created and associated with a determined QoS on a per session basis. A subscriber station may then have resources reserved to provide the QoS for a media stream.

Figure 1:
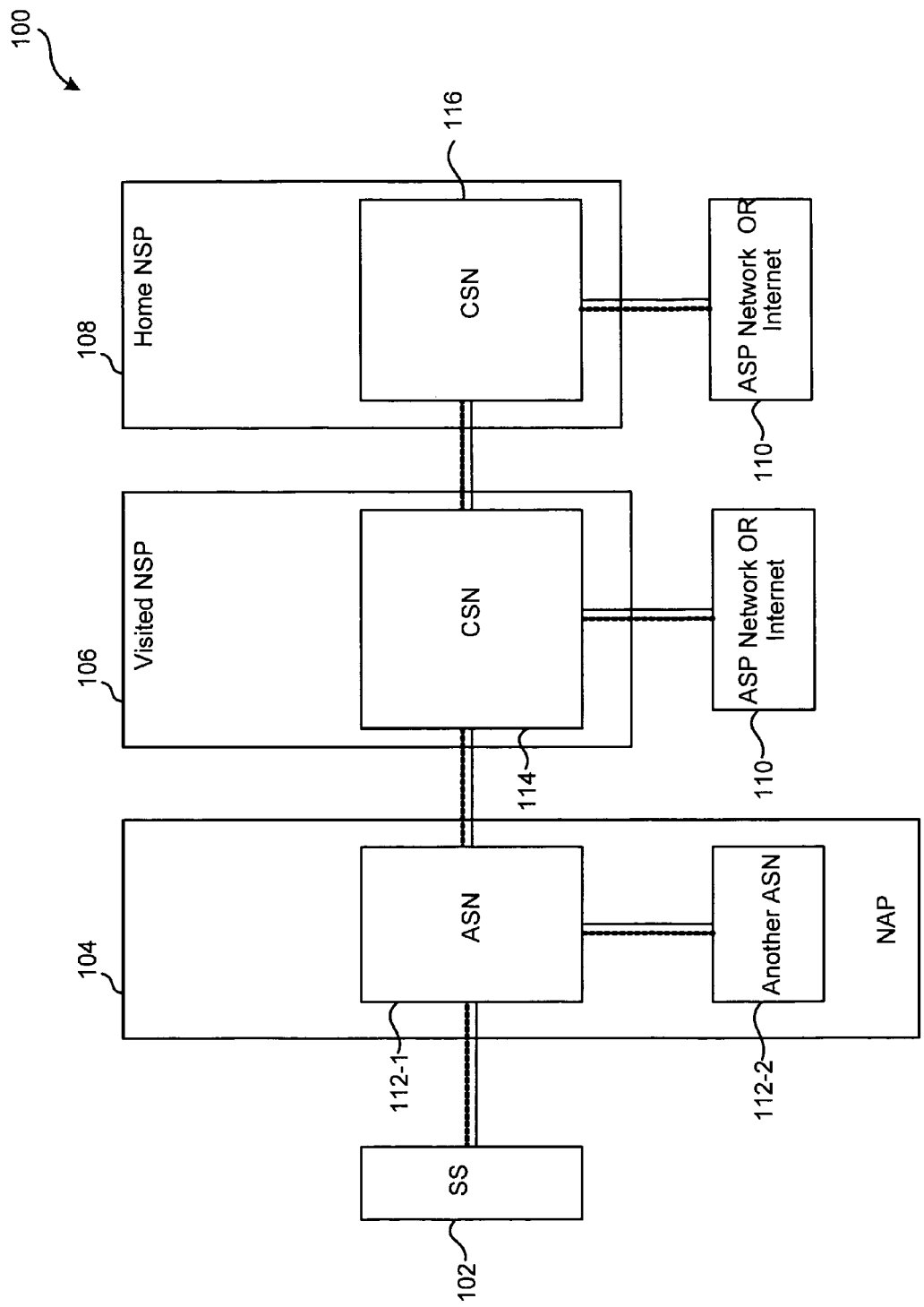
FIG. 1 shows a system illustrating an example of a network according to one embodiment of the present invention.

FIG. 1 shows a system 100 illustrating an example of a network according to one embodiment of the present invention. In one embodiment, system 100 includes a worldwide interoperability for microwave access (WiMAX) network. Although WiMAX may be described, it will be recognized that other wireless access networks may be appreciated in addition to other wire line networks and protocols.

System 100 includes a subscriber station 102, network access provider (NAP) domain 104, a visited network service provider (NSP) domain 106, a home NSP domain 108, and application service provider (ASP) network 110. Although this system is described, it will be recognized that variations of system 100 will be appreciated.

Subscriber station 102 may include a mobile device, such as a laptop computer, cellular phone, personal digital assistant (PDA), Blackberry device, soft phone, set-top box, personal computers, etc. Subscriber stations (SS) may be mobile devices or stationary devices. Also, subscriber stations 102 may communicate through a wireless network, wire line network, or a combination of both.

NAP domain 104 includes access service networks 112. ASN 112 connects a subscriber station through a base station to a service provider network. For example, ASN 112 connects to a connectivity service network (CSN) 114 of visited NSP domain 106 or a CSN 116 of home NSP domain 108. Subscriber station 102 may connect to different ASNs 112 as it roams through NAP domain 104. For example, subscriber station 102 may move from ASN 112-1 to ASN 112-2. This may occur as a user roams with subscriber station 102 to different locations. When this occurs, ASN 112-1 may hand off the service to ASN 112-2.

CSN 116 is a network associated with a home network. For example, subscriber station 102 may be associated with a home address in a home network. This is the base network for subscriber station 102. When the subscriber station roams to other networks operated by different NSPs, then the subscriber station accesses CSN 114 through visited NSP domain 106.

Subscriber station 102 may access the Internet or other ASP networks 110 through CSN 114 and CSN 116. CSN 114 and CSN 116 are access networks that provide the connectivity to the Internet, etc. Services may then be provided through ASP networks 110 and the Internet.

Embodiments of the present invention provide a gateway in ASN 112. The gateway provisions QoS for services requested by subscriber station 102. In one embodiment, the QoS is provided for the services without using an IMS infrastructure. In this case, gateway 102 does not need to communicate with an IMS infrastructure to have dynamic QoS provisioned. The gateway intercepts call control signaling messages and determines a policy associated with a user of subscriber station 102. A QoS is then provisioned for a media stream associated with subscriber station 102.

Figure 2:
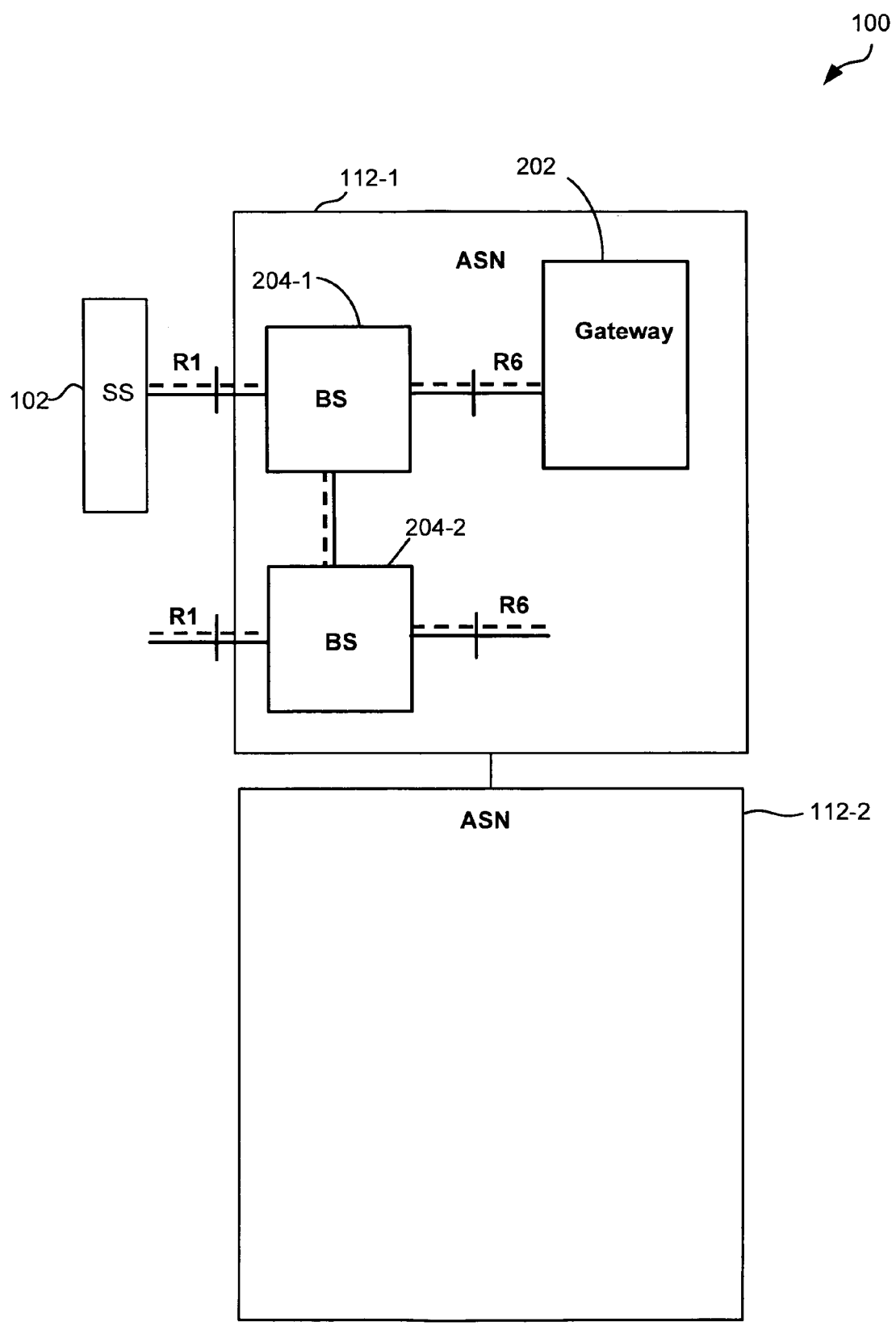
FIG. 2 depicts a more detailed embodiment of the system according to embodiments of the present invention.

FIG. 2 depicts a more detailed embodiment of system 100 according to embodiments of the present invention. As shown, ASN 112 includes a gateway 202 and multiple base stations 204.

Base stations 204 provide an access point to ASN 112. In one embodiment, a link RI may be a wireless link. The link RI may use wireless protocols and procedures, such as those provided in 802.16e. Other protocols may also be appreciated, such as 802.11x, and further enhancements to the 802.16 protocol and its successors will also be appreciated.

Gateway 202 may be a network device that is found in ASN 112. Gateway 202 is configured to communicate with home NSP 108 and/or visited NSP 106. Communications from subscriber station 102 may flow through base station 204 to gateway 202. A link R6 between base station 204 and gateway 202 may be a wireless or wire line link. In one embodiment, a tunnel between base station 204 and gateway 202 may be established for communications.

In one embodiment, gateway 202 is configured to provision a QoS for a media stream associated with subscriber station 102. Gateway 202 intercepts control signaling messages for subscriber station 102. For example, subscriber station 102 may request a service. That service may be requested and set up using control signaling messages, such as session initiation protocol (SIP) control signaling messages. Gateway 202 is in the control signaling path for subscriber station 102 and thus can intercept the control signaling messages.

Gateway 202 then can determine a policy to enforce for the service. For example, the policy may include QoS parameters that may be enforced for the service. When the service request is received, gateway 202 creates a new session for subscriber station 102. The session may be a service flow that reserves resources for a media stream, such as a real-time protocol (RTP) media stream. For the new session, gateway 202 determines QoS parameters to be enforced for the media stream.

The QoS parameters may provide a certain assurance of service. QoS may also refer to any parameters that govern the quality of delivering of media. A person skilled in to art will appreciate various QoS parameters that can be provided.

Gateway 202 then communicates the QoS parameters to base station 204-1. Base station 204 then reserves the appropriate resources to provide the QoS for the media stream. In one embodiment, resources are reserved over the air link R1 between base station 204-1 and subscriber station 102. Accordingly, a media stream for the service may be provided QoS over the air link. The media stream may flow from subscriber station 102 to ASN 112-1, and vice versa. For example, subscriber station 102 may be receiving a streaming video download. Also, subscriber station 102 may be participating in a VoIP telephone call. Other services will also be appreciated.

Gateway 202 may keep track of sessions and also determine when a session is ended. For example, when a session is ended, control signaling messages are sent to tear down the session or an IP session tear-down is performed. Gateway 202 then signals to base station 204 that it can release the reserved resources for the session.

Accordingly, a mechanism for reserving and releasing air link and network resources for subscriber stations 102 is provided. This may be provided in a wireless network infrastructure that does not include contact with an IMS infrastructure.

When subscriber station 102 roams and connects to another base station 204-2, a handoff of the QoS parameters for the service may be provided between base station 204-1 and base station 204-2. Base station 204-2 can then reserve resources for the media stream when the handoff occurs. Also, gateway 202 may resend the QoS parameters to base station 204-2. Accordingly, subscriber station 102 may seamlessly roam between base stations 204 and continue to receive the media stream with the QoS provisioned.

Additionally, subscriber station 102 may roam between ASNs 112. For example, communication between ASN 112-1 and ASN 112-2 may occur to hand off the QoS parameters to ASN 112-2. Resources can then be reserved in ASN 112-2 to provide the service.

Figure 3:
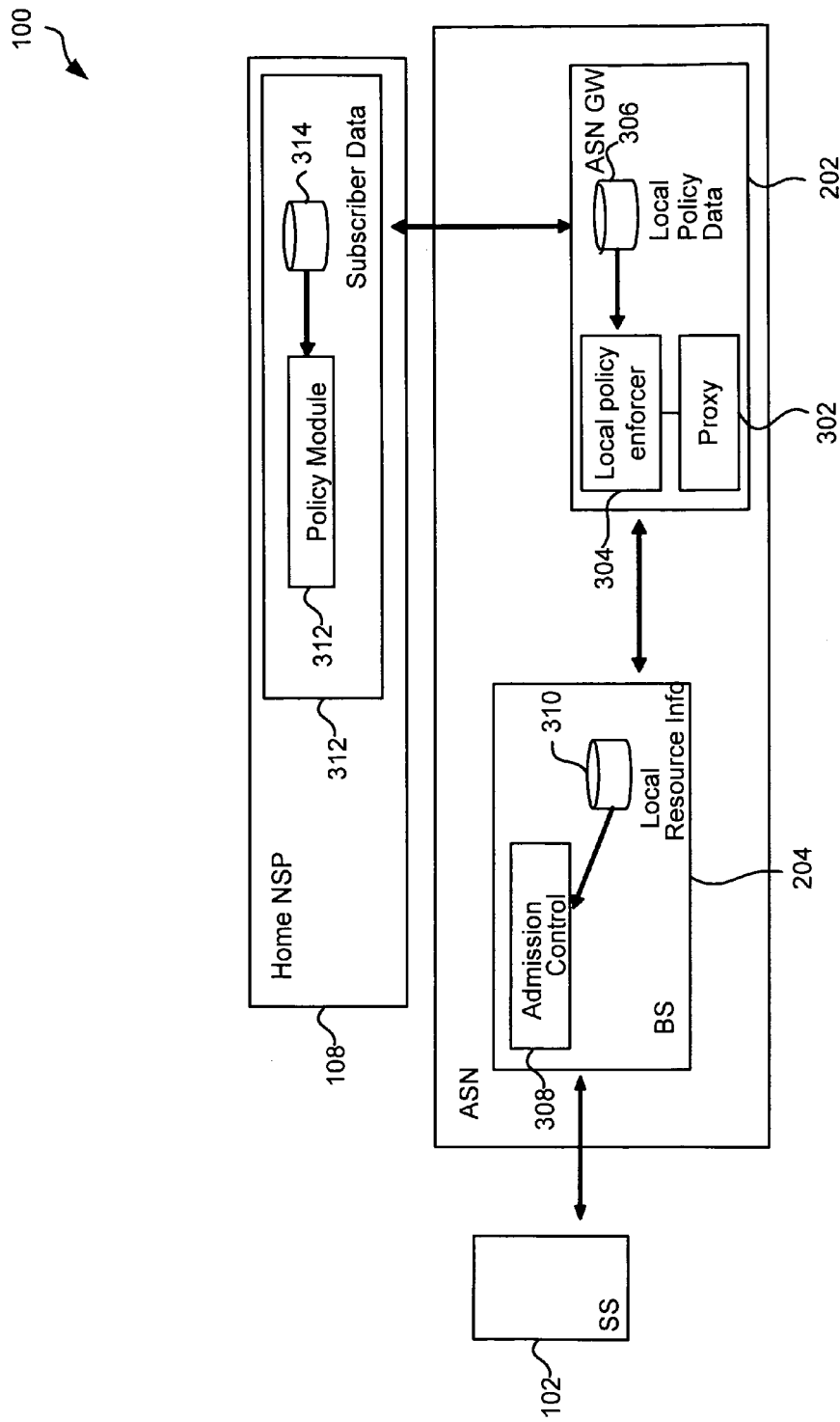
FIG. 3 depicts another more detailed embodiment of system according to embodiments of the present invention.

FIG. 3 depicts a more detailed embodiment of system 100 according to embodiments of the present invention. As shown, gateway 202 includes a proxy 302, a local policy enforcer 304, and a policy database 306. Base station 204 includes an admissions control module 308 and a local resource information database 310. CSN 116 of home NSP 108 includes a policy module 312 and a subscriber database 314.

Gateway 202 receives signaling from subscriber station 102 at proxy 302. In one embodiment, proxy 302 may be a SIP proxy. Proxy 302 may be an adapter for various protocols that are used. For example, a real time streaming protocol (RTSP) adapter may be provided to receive RTSP signaling or media in addition to the SIP proxy. It will be recognized that other protocols may also be appreciated.

Proxy 302 may be embedded in gateway 202 or can also be constructed via inspection using network-based application recognition (NBAR) or a content services gateway (CSG) in a Cisco mobile exchange (CMX). Although proxy 302 is described, it will be recognized that gateway 202 may not need to use a proxy.

Proxy 302 is in a signaling path for subscriber station 102 and thus can intercept call control signaling messages for subscriber station 102. In one embodiment, the control signaling messages indicate that a service is being requested by subscriber station 102. For example, a user may be requesting a streaming voice call or a video call.

Proxy 302 sends the request to a local policy enforcer 304, which can enforce a policy for the service request. Local policy enforcer 304 may determine a policy in policy database 306 for a user. For example, a user or device identifier may be used to identify a user. A policy associated with the user may then be determined.

Gateway 202 may not be in the user's home network and may not initially include a policy for the user. However, home NSP 108 is a home network for a user associated with subscriber station 102 and thus may include a user profile. For example, subscriber data may be stored in subscriber database 314. The subscriber data may include the user profile, which may provide a policy or information on QoS that should be applied to certain services for the user. Policy module 312 may push the policies to gateway 202, which may store the policies in policy database 306.

In one embodiment, when subscriber station 102 registers with gateway 202, gateway 202 may contact CSN 116 to register subscriber station 102. In one embodiment, CSN 116 may include an authentication, authorization, and accounting (AAA) server. During authentication/authorization with the AAA server, the policy may be downloaded to policy database 306.

When the request for a service is received, local policy enforcer 304 retrieves any policies associated with the user and can apply them to determine QoS parameters for the service. For example, local policy enforcer 304 may determine that a first QoS should be applied to a voice call and a second QoS should be applied for a video call.

Local policy enforcer 304 then sends the QoS parameters to base station 204. Admission control module 308 then can reserve resources to enforce the QoS based on the QoS parameters. For example, resources may be reserved over an air link between subscriber station 102 and base station 204. The resources may be reserved by sending a DSA-REQ to subscriber station 102 to reserve resources over the air link. Other methods of reserving resources will be appreciated.

In one embodiment, admission control module 308 uses local resource information 310 to determine which resources are available. Admission control module 308 then reserves the appropriate resources that are needed to provide the QoS for the service.

Gateway 202 also sends session classifiers that may be used to distinguish the media stream for subscriber station 102. For example, to provide the QoS for the service, base station 204 should be able to identify which packets received from subscriber station 102 are associated with the media stream for which the QoS is provisioned. Subscriber station 102 may include the session classifiers in the packets. Base station 204 can then identify the packets using the session identifiers and provide the appropriate QoS.

Embodiments of the present invention provide QoS on a per session basis. Thus, QoS is performed dynamically based on control signaling messages that are received. QoS may be provisioned for a new session that is created for a requested service. A media stream flowing through the session is then provisioned the QoS determined.

Gateway 202 applies QoS without any contact with an IMS infrastructure. This is advantageous because gateway 202 does not have to communicate with a separate infrastructure. Rather, the messaging to provision the QoS for the session is performed using gateway 202 and base station 204. Gateway 202 and base station 204 already share a security association between them and thus do not need a separate security association and authentication as would be needed if gateway 202 communicated with a separate IMS infrastructure. Further, gateway 202 is closer to subscriber station 102 and thus can respond faster and in a more efficient manner to provision resources for providing the QoS for the service.

Although the invention has been described with respect to specific embodiments thereof, these embodiments are merely illustrative, and not restrictive of the invention. For example, base stations, subscriber stations, and gateways may be other network devices as appreciated by a person skilled in the art.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for providing quality of service (QoS) for services using a network device, the method comprising:
   receiving, at the network device, one or more control signaling messages for a service from a subscriber station, the network device being in a signaling path for the subscriber station, the subscriber station communicating through a wireless network, the one or more control signaling messages including a request for the service for the subscriber station;
   determining, using the network device, a policy to apply for the service based on receiving the one or more control signaling messages including the request for the service;
   determining, using the network device, QoS parameters for the service based on the one or more control signaling messages and the policy; and
   causing resources to be reserved in the wireless network for a media stream to provide the service to the subscriber station, the reserved resources providing a QoS for the media stream that is determined based on the determined QoS parameters.

2. The method of claim 1, wherein causing resources to be reserved comprises causing a base station associated with the subscriber station to reserve the resources in the wireless network.

3. The method of claim 1, further comprising sending classification information to the subscriber station, the classifiers allowing the subscriber station to identify the media stream to allow the QoS to be applied.

4. The method of claim 1, further comprising:
   determining, at the network device, when a session end control signaling message for ending the session is received; and
   causing the reserved resources to be released.

5. The method of claim 1, further comprising:
   receiving packets from the media stream, the packets including a classification information; and
   applying the QoS for the packets.

6. The method of claim 1, further comprising:
   establishing a new session based on the one or more control signaling messages;
   associating the QoS parameters with the new session.

7. The method of claim 1, further comprising communicating with a home network associated with the subscriber station to determine the policy associated with the subscriber station.

8. The method of claim 1, wherein the QoS is provided without using an IMS infrastructure.

9. The method of claim 1, wherein the QoS is provided without contacting an IMS infrastructure.

10. The method of claim 1, wherein the network device and the base station share a security association.

11. A network device configured to provide quality of service (QoS) for services, the device comprising:
    a proxy configured to receive one or more control signaling messages for a service from a subscriber station, the proxy being in a signaling path for the subscriber station, the subscriber station communicating through a wireless network, the one or more control signaling messages including a request for the service for the subscriber station;
    one or more computer processors; and
    a memory containing instructions that, when executed by the one or more processors, cause the one or more processors to perform a set of steps comprising:
    determining a policy to apply for the service based on receiving the one or more control signaling messages including the request for the service;
    determining, using the one or more computer processors, QoS parameters for the service based on the one or more control signaling messages and the policy; and
    causing resources to be reserved in the wireless network for a media stream to provide the service to the subscriber station, the reserved resources providing a QoS for the media stream that is determined based on the determined QoS parameters.

12. The network device of claim 11, wherein the instructions cause the one or more processors to cause a base station associated with the subscriber station to reserve the resources in the wireless network.

13. The network device of claim 11, wherein the proxy is configured to send classification information to the subscriber station, the classifiers allowing the subscriber station to identify the media stream to allow the QoS to be applied.

14. The network device of claim 11, wherein the proxy is configured to:
    determine when a session end control signaling message for ending the session is received; and
    cause the reserved resources to be released.

15. The network device of claim 11, wherein the instructions cause the one or more processors to perform further steps comprising:
    receiving packets from the media stream, the packets including a classification information; and
    applying the QoS for the packets.

16. The network device of claim 11, wherein the instructions cause the one or more processors to perform further steps comprising:
    establishing a new session based on the one or more control signaling messages;
    associating the QoS parameters with the new session.

17. The network device of claim 11, wherein the instructions cause the one or more processors to perform a further step comprising communicating with a home network associated with the subscriber station to determine the policy associated with the subscriber station.

18. The network device of claim 11, wherein the QoS is provided without using an IMS infrastructure.

19. The network device of claim 11, wherein the QoS is provided without contacting an IMS infrastructure.

20. The network device of claim 11, wherein the network device and the base station share a security association.

21. An apparatus configured to provide quality of service (QoS) for services using a network device, the apparatus comprising:

means for receiving, at the network device, one or more control signaling messages for a service from a subscriber station, the network device being in a signaling path for the subscriber station, the subscriber station communicating through a wireless network, the one or more control signaling messages including a request for the service for the subscriber station;

means for determining, using the network device, a policy to apply for the service based on receiving the one or more control signaling messages including the request for the service;

means for determining, using the network device, QoS parameters for the service based on the one or more control signaling messages and the policy; and means for causing resources to be reserved in the wireless network for a media stream to provide the service to the subscriber station, the reserved resources providing a QoS for the media stream that is determined based on the determined QoS parameters.

* * * * *

UNITED STATES PATENT AND TRADEMARK OFFICE
CERTIFICATE OF CORRECTION

| | | |
|---|---|---|
| PATENT NO. | : 7,616,962 B2 | |
| APPLICATION NO. | : 11/448278 | |
| DATED | : November 10, 2009 | |
| INVENTOR(S) | : Oswal et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 705 days.

Signed and Sealed this

Nineteenth Day of October, 2010

David J. Kappos
*Director of the United States Patent and Trademark Office*